3,293,339
METHOD OF DRAWING AND DYEING ARTICLES OF POLYPROPYLENE
David Shuff Gates, Wilmington, Del., assignor to E. I. du Pont de Nemours and Company, Wilmington, Del., a corporation of Delaware
No Drawing. Filed Mar. 28, 1963, Ser. No. 268,538
7 Claims. (Cl. 264—78)

This invention has to do with fibers, films, and the like of polypropylene containing additives and with a process for introducing the additives.

In the final form in which they are sold to the ultimate user, most polypropylene fibers contain modifying agents of one sort or another. The most usual single-modifying agent is a dyestuff. In addition to dyes, many other modifying agents are also used in enhancing the properties and appearance of polypropylene fibers. Stabilizers are sometimes added to prevent or decrease deterioration of the polymer structure on exposure to light, ultraviolet radiation, or heat. Anti-yellowing agents have been employed. Resins, other polymers, cross-linking agents, and the like are also added to fibers or fabrics in order to promote wrinkle resistance, crease resistance, ease of laundering, and other physical properties.

Such modifying agents are normally applied to the oriented fibers or filaments. They can be added to the undrawn filaments under certain circumstances but, in most of these cases, reliance is placed upon the natural tendency of the modifying agent to diffuse into the interior structure of the polymer or to affix itself firmly on the surface of the fiber or filament. Such diffusing or adhering tendencies have been augmented in the past by pressure dyeing, by the use of dye carriers which are partial solvents or swelling agents for the polymer and by other processes which have in common that they depend upon a natural and mutual affinity between the modifier and the polymer itself.

There have been many classes of modifying agents which have not been successfully and permanently combined with the basic polymer structure because of a lack of affinity between the two substances. In some cases, the modifier does not penetrate at all but merely adheres to the surface and is in danger of being lost on repeated washings or wearings by abrasion or diffusion. This has imposed serious limitations upon the use of certain dyestuffs, particularly in the preparation of textiles from polypropylene fibers. Also, while it has been possible to develop antistatic agents, wetting agents, light stabilizers, and the like for application to polypropylene fibers, the permanence of such applications has not always been satisfactory.

The problem of dyeing is especially serious with polypropylene filaments and films. It has been proposed that the polymer be colored by the incorporation of heat stable dyestuffs and pigments in the solution or melt of the polymer before extrusion. This is an expensive procedure entailing careful process controls and the necessity of stocking large quantities of various colored yarns.

It has also been proposed to chemically modify the shaped articles such as fibers by a suitable after-polymerization treatment as, for example, peroxidation or irradiation and grafting with monomers that would leand dyeability to the product. This method is quite an expensive process inasmuch as it requires the handling of large amounts of shaped articles and recovering the residual monomers. It is not completely satisfactory due to the difficulty of polymerizing and controlling the desired combination of monomers to the shaped articles.

It has also been proposed to chemically alter the surface of shaped articles by after treatments such as sulfonation, chlorosulfonation and the like. These processes have the great disadvantage of being extremely expensive and difficult to control and although they can confer dyeability to the shaped article, it is observed that the dyed articles from this process are extremely unstable to light.

It is an object of this invention to provide a means of incorporating a modifying agent into a shaped article of polypropylene that does not require a chemical modification of the propylene or the use of additives.

Another object is to provide a process for the dyeing of polypropylene filaments.

One object of this invention has been attained by a process comprising the steps:

I. Preparation of a shaped article of polypropylene having the characteristics selected from the group consisting of A. Gamma orientation and an orientation angle of 10° to 45°, or
B. Gamma orientation and a heat stable orientation angle of 10–62°, and II. Drawing the shaped article at a temperature of between about 10° C. to 80° C. in contact with a homogeneous liquid draw bath which wets the polymer and has a surface tension less than about 60 dynes per centimeter and contains a modifying agent and preferably an organic liquid diluent.

Preferably the drawing is done with the shaped article immersed in the single phase liquid draw bath.

Certain terms used in describing the invention are defined below. They are used throughout the specification and claims as defined.

"Orientation angle" as used herein, is a parameter which represents the alignment of molecular axes of the material forming a fiber, with respect to the fiber axis. The orientation angle is indicated by the azimuthal extent of the intensity of the (040) X-ray diffraction arc at $2\theta=16.7°$. These indices are used according to G. Natta et al. Atti accad. nazl. Lincei, Rend. Classe si. fis. mat. e nat. [8], 21, 365 (1956). The orientation angles are measured according to the technique of H. G. Ingersol, Journal of Applied Physics, 17, 924 (1946), on the instrument described by J. E. Owens and W. O. Statton, Acta Crystallographica, 10, 560 (1957). This angle using the (040) arc is a measure of crystalline orientation with respect to the fiber axis (C axis).

"Gamma" orientation is the unusual orientation or condition of material in an object which is detected by X-ray diffraction techniques by a diffraction pattern in which the (110) diffraction arc at $2\theta=14.0°$ exhibits intensity maxima at an azimuthal angle greater than 50° from the equator. The intensity maxima has a ratio greater than 0.6 when compared to the intensity maxima of the (022.12$\bar{2}$) X-ray diffraction arc at $2\theta=28.6°$. This ratio $(I_\gamma/I_a)$ is determined from a radial photometer trace obtained 10° from the meridian on the Leeds and Northrup Knorr-Alber Model 6700–P-1 microphotometer with 0.01 mm. slit width and 1.5 mm. slit length. The peak intensities of the maxima are determined above the background scattering in the following manner: For the peak at $2\theta=14.0°$ a straight line is drawn on the photometer trace connecting the intensity values at $2\theta=9.3°$ and $2\theta=11.3°$; this sloping straight line is extended under the peak and the intensity value of this line at the peak $2\theta$ position is used as the background value and subtracted from the peak value to give a quantity, $I_\gamma$. For the peak at $2\theta=28.6°$, a sloping straight line is drawn connecting the intensity values at $2\theta=26.0°$ and $31.2°$; the value on this line at the peak position is subtracted from the peak value to give a quantity, $I_a$.

Oriented fibers having a gamma intensity ratio $(I_\gamma/I_a)$ of less than 0.6 are designated as having "normal" orientation hereinafter. Oriented fibers having a gamma intensity of at least 1.0 are preferred as the starting material in the instant process.

By the term "heat stable," used in connection with polypropylene in the "gamma" condition, is meant that the orientation angle does not change more than about 10% upon heating at a temperature of 135° C. for 10 minutes in a tensionless condition.

The polypropylene used to make the fibers to be treated according to this invention, may be of any high molecular weight polymer characterized by a melt index (ASTM Standards, 1958, D–1238–57T, Part 9, page 38) of 0.1 to 200. Preferably polymer with a melt index of 0.4 to 100 is used.

By "drawing" is meant a process wherein a solid filament or film is positively forwarded by a first moving means (e.g., a feed roll) to a second moving means operating at a higher speed (e.g., a draw roll) so that the filament or film is premanently elongated (i.e., stretched beyond its yield point). The drawing of this invention occurs by a long tapering process and not by the sharp-neck process characteristic of polyamides, for example. The expression "draw ratio" and designated as "×" means the ratio:

$$\frac{\text{Speed of second moving means}}{\text{Speed of first moving means}}$$

By the expression "modifying agent" is meant any substance soluble in the draw bath which is not substantially removed from the polypropylene object upon subsequent exposure to water or air, or which can enter into a chemical reaction so that the reaction product of the original modifying agent is rendered permanently fast. Such subsequent reactions are well known and include polymerization of monomers, the formation of water-insoluble salts from water soluble compounds and the like. The most preferred application of the present invention resides in the use of dyes as the modifying agent.

Polymers which are incompatible with the polymer making up the filament can be imbibed into the filamentary structure. Lubricants such as silicone oils, Syl Chem 21, poly(2-ethoxy acrylate) and poly(ethyl acrylate) can be infused to give a permanent low-friction surface. Flameproofing agents, flame retardants, and the like such as bis(chloroethyl) vinyl phosphate and phytic acid can be infused. Cross-linking agents which cannot be added to the polymer before or during melt spinning (because they would cross-link during spinning) can, however, by the process of the present invention be added by this low-temperature drawing technique, and then the cross-linking agents can be activated later. Inorganic salts, such as silver nitrate, potassium bichromate, and the like can be employed. Wetting agents as well as hydrophobic agents can be imbibed. Antisoilant additives are highly useful. Adhesives and bonding agents can be infused to provide fibers and films with greater adhesion to rubber, to other polymers, and to surface-modifying chemicals. In addition, it is possible to infuse into the filamentary structure several substance at the same time, for example, mixtures of two totally different types of dyes of like or different colors as well as three colors of the same type. Thus, one can add a dye-stuff, an anti-static agent, and a dye stabilizer or ultra-violet absorber simultaneously and economically in a single process step.

Desirable liquid draw baths for the purposes of the present invention in general have a surface tension relative to air of not gerater than 60 dynes per centimeter when measured at the temperature at which it is proposed to employ the bath. The desirability of a low surface tension is not completely understood, but it aids in the progress of the modifying additive from the bulk liquid phase into the interior structure of the polymer. In general, organic liquid diluents are preferred. Water by itself was found not to be a very useful draw bath. Dilute aqueous solutions of soaps or detergents can be used but are inferior to organic liquid diluents.

The draw bath should also preferably have a high tendency to wet the surface of the object being drawn. In general, the wetting angle between a liquid and a polymer is determined by measuring the contact angle between a film of the polymer and a droplet of the liquid. Such a wetting angle is normally measured so as to include rather than exclude the liquid phase; that is, the wetting angle of a poor wetting agent will be more than 90°. For the practice of the present invention, it is preferable that the wetting angle be less than 90°, and under many circumstances, it is found that wetting angles as low as 30° are obtained with the best drawing baths.

The phrase "organic liquid diluents" includes alcohols such as ethyl, propyl and butyl; ketones, e.g., acetone; carboxylic acids, e.g., acetic; hydrocarbons; chlorinated hydrocarbons such as methylene chloride, 1,1,2-trichloroethane, and compounds such as dimethylformamide, tetrahydrofuran, to name a few. Mixtures of organic liquids are suitable. Also, aqueous solutions containing preferably at least 10% of an organic liquid diluent may be used.

The filaments or films of polypropylene which are subjected to the novel drawing treatment of the invention to permit imbibition of modifying agents during the drawing process must possess gamma orientation, and an orientation angle of 10° to 45° or a heat stable orientation angle of 10° to 62°. Such filaments or films may be prepared as described below. In some instances, the shaped articles having these properties may be obtained upon suitable treatment of articles of the prior art.

In order to obtain filaments receptive to the process of the invention, the extrusion of the polypropylene fibers should be under such conditions so as to afford gamma orientation or potential gamma orientation. The spinning variables are adjusted to regulate the viscosity of the polymer melt as extruded through the spinneret hole, and the viscosity of the fiber as it changes from the molten to the solid state in the threadline. Under any one set of conditions of polymer type, spinneret orifice dimensions, number of orifices and polymer throughput, gamma or potential gamma orientation is achieved through temperature regulation and windup speed. The conditions selected will depend on the temperature of the molten polymer before being extruded, the rate of extrusion, the geometry of the spinneret, the extent of cooling or heating on the spinneret by outside heat or quenching air. A cooling air quench may be used as the fibers form to assist with the proper temperature control.

The fiber should be oriented to the extent giving an orientation angle of 10° to 45° by suitable selection of spin stretching under suitable quenching conditions (i.e., windup speed/calculated speed of polymer leaving the orifice) and/or suitable drawing of the solidified fibers. The drawing can be done under any suitable conditions but the draw ratio must not exceed 2.5× prior to imbibition drawing as described below. Preferred starting fibers for the process of this invention have had no drawing.

Suitable starting material for this invention can also be obtained by spinning filaments having gamma or even only potential gamma orientation and orientation angle from 70° to 180° and submitting the filaments to a brief heat treatment at 105 to 160° C., preferably 135 to 150° C. This treatment increases the orientation (lowering the orientation angle) and changes potential γ orientation to a measurable gamma orientation. Generally the orientation angle is made "stable" by this process. The heat treatment is especially valuable for polypropylene having a melt index of 5 or greater.

The fiber preferably is in a free-to-shrink condition during the heat treatment, the amount of relaxation (shrinkage) by the treatment usually varying from 1 to 50%.

The time of treatment is not critical and can range from 0.6 second to 24 hours. The heating can be done as a distinct separate process as in an oven or an autoclave or it can be conducted continuously.

With the proper starting polypropylene shaped object at hand, the desired modifying agent is imbibed or infused into the object by drawing in contact with a homogeneous liquid draw bath containing the modifying agent.

The temperatures of the bath may vary between about 10° and 80° C. Below these limits the drawing is more difficult and may result in intermittent imbibition of the modifying agent. Very little, if any, imbibition occurs above 80°. Preferably the bath should have a temperature of 20 to 60° C.

The starting fiber or film may be wetted with the draw bath by passing through the bath or passing over a wick before drawing. The fiber can be drawn while being sprayed with the draw bath. The best results are obtained when the drawing takes place in a bath of the drawing liquid.

It may be advantageous to have a snubbing pin in the bath between the feed and draw rolls. Passage of the yarn over or around this snubbing surface restricts the drawing to that zone of the process.

The total draw ratio may vary from about 1.1× to 6× or more and can be selected to give the physical properties desired.

It will be understood by those skilled in the art that both the draw speed and draw ratio for a given temperature will be limited by the orientation of the starting fibers.

The examples below are intended solely to illustrate the invention.

EXAMPLE I

A. Crystalline polypropylene of melt index 0.7 (inherent viscosity of 2.75) (Profax, made by the Hercules Powder Co. of Wilmington, Delaware), is extruded as a melt at 296° C. through a spinneret at about 260° C. The spinneret contains 20 round orifices each 0.03 inch in diameter. The filaments thus formed are passed through a cylindrical heater 2.75 inches inside diameter and 2 inches long, the top of which is located 1.5 inches below the spinneret. The inside of the heater has a temperature of about 360° C. The filaments are then quenched by passing them through a cylindrical quenching chamber 2 inches inside diameter, located 7 inches below the spinneret. The double-wall quenching chamber is supplied with 25° C. air at a rate of about 2 cubic feet per minute. The air passes through a porous metal band 1.5 inches high fitted in a slot in the inner wall of the quenching chamber, and impinges on the filiments. The filaments are wound up at 250 yards per minute (y.p.m.).

B. Filaments spun as in A are forwarded by a feed roll immersed in ice water at 250 y.p.m. to draw rolls rotating at 550 y.p.m. and then to a windup bobbin. The yarn spontaneously crimps when the tension on the bobbin is released.

C. A 20-filament yarn is prepared as in B using the same 0.7 melt index polymer but with the omission of the heater and the quenching chamber. The yarn is continuously drawn as in B at a feed/draw speed of 333/700 y.p.m. and the yarn is sprayed with 20° C. water as it leaves the feed roll. When the yarn (4.5 denier per filament) is removed from the bobbin it spontaneously crimps.

D. The polymer used above is extruded as a melt at 295° C. through a spinneret at 240° C. The spinneret contains 38 round orifices each 0.009 inch in diameter. The threadline is quenched by air at room temperature coming from a nozzle 2 inches high by 1.5 inches wide located 1 inch from the threadline and 0.5 inch below the spinneret. The relatively high velocity of the quench air is reflected in a threadline tension of 7 grams. The yarn (5.6 denier per filament) is wound up at 115 y.p.m.

E. A crystalline polypropylene of melt index 12 is made by degrading the starting polymer of A by heating in an extruder at 230° C. in the presence of t-butyl hydro- peroxide and then adding 0.1% 4,4'-butylidene bis (6-t-butyl m-cresol) as a stabilizer.

This polymer is extruded as a melt at 280° C. through a spinneret at 280° C. and the yarn wound up at 1227 y.p.m. The spinneret contains 34 round orifices of 0.009 inch diameter.

F. A loose skein of a portion of the yarn E is placed in an air oven at 140° C. for 15 minutes.

G. The polymer used for Item E (12 melt index) is extruded as a melt at 290° C. through a spinneret at 280° C. and the 20 filament yarn (tribrachiate cross-section of 45 denier per filament) is wound up at 65 y.p.m.

H. A loose skein of the yarn of G is placed in a 130° C. oven for 15 minutes.

I. A commercially available sample of a crystalline polypropylene film (.004 inch thick) with a melt index of 6.6 is used.

J. A strip of the film I is drawn 2× along its length over a pin at 100° C.

K. A portion of the drawn film of J is heated in a 120° C. air oven for 5 minutes.

The results of X-ray diffraction pictures from these yarns and films are reported in Table 1. Items A, B, C, D, F, H, and K are satisfactory as the starting product for the process of this invention. Items E, G, I, and J are not suitable for this invention.

*Table 1*

| Item | Heat Treatment, ° C. | Orientation | | | Gamma Intensity Ratio |
|---|---|---|---|---|---|
| | | Angle | Type | Stable | |
| A | None | 16° | Gamma | No | 2.0 |
| B | None | 10° | do | No | >0.6 |
| C | None | 18° | do | No | >0.6 |
| D | None | 24° | do | No | >0.6 |
| E | None | 180° | | No | |
| F | 140 | 39° | Gamma | Yes | 2.9 |
| G | None | <53° | do | No | >0.6 |
| H | 135 | 53° | do | Yes | >0.6 |
| I | None | 180° | | No | |
| J | None | 48° | Gamma | No | >0.6 |
| K | 120 | 42° | do | Yes | 2.9 |

*Example II*

The example illustrates the need for heat treatment of poorly oriented fibers and films for use in this invention and the criticality of orientation in obtaining dye imbibition during the drawing step.

Polypropylene yarns designated as Items E, F, G, and H of Example I are drawn by hand in a bath of ethanol/water 1/1 containing 1% of the acid dye C.I. 15675.

Films (Items I, J, and K) are drawn in a *saturated* solution of the basic blue dye, C.I. 42025 in acetone at room temperature.

The starting yarn for Item 5 is made by heating yarn E in a taut condition at 135° C. for 15 minutes. This treatment converts yarn E to one meeting the requirements of the starting material of the invention.

The starting yarn for Item 6 is a sample of yarn E that has been boiled in water for 15 minutes. This treatment is insufficient to give the fiber an orientation angle of between 10° and 45° or a heat stable orientation angle of between 10° and 62°. Results are given in Table 2. The starting yarns and films that meet the needs of this process, Items 2, 4, 5, and 9, dye to good useful shades that are washfast. These drawings are repeated with the omission of the dye from the bath. The drawn fibers are then placed in a draw bath containing the dye. The fibers are barely stained (extremely light shade) by this procedure and the dye is readily washed off.

Samples of E and F are merely immersed in the above drawing bath containing dye. They are barely stained by the dye and the dye is washed off.

Table 2

| Item | Feed Stock | Heat Set | Draw Ratio | Dye Depth |
|---|---|---|---|---|
| 1 | E | No | 5× | Very light tint. |
| 2 | F | Yes | 5× | Very dark red shades. |
| 3 | G | No | 5× | Very light tint. |
| 4 | H | Yes | 5× | Very dark red shade. |
| 5 | | Yes | 3× | Do. |
| 6 | | No | 3× | Very light tint. |
| 7 | I | No | 2× | Do. |
| 8 | J | No | 2× | Do. |
| 9 | K | Yes | 2× | Medium dark blue shade. |

EXAMPLE III

This example illustrates some process variables in the inhibition dyeing of polypropylene fibers.

Starting fibers made from 0.7 melt index polymer as in Example I are drawn in various dye baths. The conditions and results are shown in Table 3.

Items 1 and 2 are forwarded by feed rolls operating at 60 yards per minute over a snubbing pin immersed in the dye bath and then to draw rolls at 120 yards per minute. The drawn product has a tenacity of 2.3 grams per denier. Items 3–12 are drawn by hand with the fiber under the surface of the dye bath.

Some samples of starting fiber A are hand drawn about 2× in a water bath containing the dye b at room temperatures, 50° and 90°. Only a very slight dye tint is obtained which is of no commercial value.

with $NH_4OH$ and then dyed by conventional means with the dye C.I. Basic Red 13, C.I. 48,015. A good dark shade that is wash-fast is obtained.

EXAMPLE VII

A portion of the yarn of Item A of Example I is drawn about 2× by hand in draw baths at 20° C. containing 1% of the dye C.I. Basic Green 1, C.I. 42,040, with results as given below.

| Draw Bath | Observation of Drawn Fiber |
|---|---|
| a. Distilled water | Very light green shade. |
| b. Distilled water containing 1% sodium lauryl sulfate. | Medium green shade. |
| c. 50% aqueous ethanol | Deep green shade. |

The surface tensions of the draw baths are 73, less than about 30, and 23–29 dynes per centimeter for items a, b, and c, respectively, thus illustrating the surprising influence of surface tension of the draw bath on imbibition.

What is claimed is:

1. A method comprising drawing a shaped article of polypropylene having gamma orientation and an orientation angle of 10° to 45° at a temperature of between

Table 3

| Item | Feed Yarn | Media | Dyestuff | Temp., °C. | Draw Ratio | Observations |
|---|---|---|---|---|---|---|
| 1 | B | Ethanol/water, 1:1 | a, 3% | 25 | 2× | Dark red shade. |
| 2 | B | do | a, 3% | 50 | 2× | Do. |
| 3 | D | Acetone | b, sat'd | 20 | 2–3× | Dark blue shade. |
| 4 | C | Ethanol/water, 1:1 | a, 3% | 25 | 1.8× | Medium dark shade. |
| 5 | A | Ethanol | b | 25 | 2× | Dark shade. |
| 6 | A | Ethanol/water, 1:1 | b | 78 | 2× | Medium shade. |
| 7 | A | Methylene chloride | b | 25 | 2× | Dark shade. |
| 8 | A | Dimethyl formamide | b | 25 | 2× | Do. |
| 9 | A | Tetrahydrofuran | b | 25 | 2× | Do. |
| 10 | A | Acetic acid | b | 25 | 2× | Medium shade. |
| 11 | A | Acetic acid/water, 1:1 | b | 25 | 2× | Do. |
| 12 | A | Acetone/water, 1:1 | b | 25 | 2× | Dark shade. | a. Acid dye C.I. 15675.
b. Basic blue dye C.I. 42.025.

Similar results to Items 1–12 are obtained when the dyes are replaced with other acid dyes, basic dyes and disperse dyes such as C.I. disperse blue 7, C.I. 62,500.

The following examples show the use of modifying agents other than dyes.

EXAMPLE IV

Fiber A of Example I is mechanically drawn about 2× at 10 yards per minute in a 20% solution of sulfanilamide in acetone. Analyses of the drawn dry fiber show the presence of 9.5% of sulfanilamide in the fiber. This fiber can then be dyed with acid dyes.

EXAMPLE V

Fiber A of Example I is mechanically drawn 2× over a snubbing pin immersed in a 20% solution of zein in dimethylformamide. The drawn dry fiber contains 26% zein by analysis and has a tenacity of 2 grams per denier. It is readily dyeable with disperse dyes.

EXAMPLE VI

The draw bath of Example V is replaced with a 15% solution of $AlCl_3 \cdot 6H_2O$ in a 1:1 mixture of ethanol/water. The drawn, dry fiber contains aluminum compounds equivalent to 4.6% $AlCl_3$. The fiber is treated about 10° and 80° C. in contact with a homogeneous liquid draw bath which wets the polymer, has a surface tension less than about 60 dynes per centimeter and contains a dye soluble therein, whereby the dye is imbibed in the body of the article.

2. A method comprising drawing a shaped article of polypropylene having gamma orientation and a heat stable orientation angle of 10° to 62° at a temperature of between about 10° and 80° C. in contact with a homogeneous liquid draw bath which wets the polymer, has a surface tension less than about 60 dynes per centimeter and contains a dye soluble therein, whereby the dye is imbibed in the body of the article.

3. The method of claim wherein the shaped article is a filament.

4. The method of claim 1 wherein the shaped article is a film.

5. The method of claim 3 wherein the total draw imparted to the filament is between about 1.1× to 6×.

6. The method of claim 1 wherein the draw bath contains an organic liquid.

7. A method comprising drawing at 2× a filament of polypropylene having gamma orientation and an orientation angle of about 16° at room temperature in contact with dimethyl formamide containing basic blue dye C.I. 42,025 whereby a dark shade is acquired by the filament.

References Cited by the Examiner

UNITED STATES PATENTS 2,278,888  4/1942  Lewis _____ 264—78

FOREIGN PATENTS 591,604  1/1960  Canada.
817,125  7/1959  Great Britain.
817,626  8/1959  Great Britain.

OTHER REFERENCES

Journal of the Textile Institute, vol. 46, No. 9, September 1955, pp. T629–T631.

Moncrieff, R. W.: Artificial Fibers, London, National Trade Press, Ltd., 1950, 1st ed.; pp. 61 and 62.

NORMAN G. TORCHIN, *Primary Examiner.*

T. J. HERBERT, *Assistant Examiner.*